United States Patent
Trant et al.

(10) Patent No.: US 11,117,820 B2
(45) Date of Patent: Sep. 14, 2021

(54) AUTOMATIC DESCALING SYSTEM

(71) Applicant: Rheem Manufacturing Company, Atlanta, GA (US)

(72) Inventors: Troy Trant, Montgomery, AL (US); Robert D. Brown, Rolla, MI (US); Edward D. Turner, Anniston, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 159 days.

(21) Appl. No.: 16/370,699

(22) Filed: Mar. 29, 2019

(65) Prior Publication Data

US 2020/0308036 A1 Oct. 1, 2020

(51) Int. Cl.
| | | |
|---|---|---|
| *C02F 5/08* | (2006.01) | |
| *F24H 9/00* | (2006.01) | |
| *C02F 1/02* | (2006.01) | |
| *C02F 101/10* | (2006.01) | |
| *C02F 103/02* | (2006.01) | |

(52) U.S. Cl.
CPC .......... *C02F 5/08* (2013.01); *C02F 1/02* (2013.01); *C02F 2101/10* (2013.01); *C02F 2103/02* (2013.01); *C02F 2209/10* (2013.01); *C02F 2303/22* (2013.01); *C02F 2307/14* (2013.01); *F24H 9/0042* (2013.01)

(58) Field of Classification Search
CPC .................................. C02F 5/08; F24C 17/02
USPC ........ 165/287; 122/379, 13.3; 210/140, 143, 210/167.07, 198.1; 137/625.47; 237/2 R, 237/8 R, 2 A
See application file for complete search history.

(56) References Cited

U.S. PATENT DOCUMENTS

| | | | | |
|---|---|---|---|---|
| 3,813,035 A | * | 5/1974 | Wobig | F24D 19/1018 236/101 R |
| 4,054,175 A | * | 10/1977 | Swearingen | C02F 5/02 165/45 |
| 5,119,988 A | | 6/1992 | Fiedrich | |
| 6,401,754 B1 | * | 6/2002 | Winquist | F16K 5/201 137/625.47 |
| 7,762,280 B2 | * | 7/2010 | Pettinaroli | F16K 11/0873 137/625.47 |
| 9,410,708 B2 | | 8/2016 | Taylor | |
| 2011/0147282 A1 | * | 6/2011 | Hellenbrand | B01D 24/383 210/85 |
| 2012/0079995 A1 | * | 4/2012 | Jacques | F24H 9/2007 122/19.2 |
| 2014/0182642 A1 | * | 7/2014 | Basham | A61H 3/0288 135/82 |

(Continued)

FOREIGN PATENT DOCUMENTS

| | | |
|---|---|---|
| WO | 2007/007241 A1 | 1/2007 |
| WO | 2012/011051 A1 | 1/2012 |

OTHER PUBLICATIONS

International Search Report and Written Opinion for PCT Application No. PCT/US20/24884 dated Jun. 4, 2020.

*Primary Examiner* — Nina Bhat
(74) *Attorney, Agent, or Firm* — Troutman Pepper Hamilton Sanders LLP

(57) ABSTRACT

An automated descaling system can be integrated into a tankless water heater or can be a separate system that is attached to a tankless water heater. The automatic descaling system comprises a cleaning media chamber and a four way valve with a motor. The descaling system can be set on an automatic cleaning schedule.

12 Claims, 9 Drawing Sheets

(56) References Cited

U.S. PATENT DOCUMENTS

2016/0273786 A1\* 9/2016 Day ................... F24D 19/0092
2018/0340708 A1\* 11/2018 Yuan ......................... C02F 1/04

\* cited by examiner

AUTOMATIC DESCALING SYSTEM

TECHNICAL FIELD

The present disclosure relates generally to water heaters, and more particularly to systems, methods, devices, and valves for automatically descaling a water heater.

BACKGROUND

Water heaters are generally used to provide a supply of hot water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Water heaters generally input water from a municipal source or from a well. Both of these water sources can include calcium and magnesium carbonates. Water with higher levels of these minerals is considered "hard water." The presence of these minerals in water leads to accumulation of mineral scale deposits ("scaling") of the water heater and downstream appliances.

An industry wide problem is the fouling of water heaters due to these mineral scale deposits, especially on heat transfer surfaces of water heaters which leads to efficiency losses and possible failure of the water heater. To mitigate fouling it is recommended that a typical tankless water heater be cleaned once a year.

SUMMARY

In general, in one aspect, the disclosure relates to a water heater comprising: a water inlet; a water outlet; a heating chamber; a cleaning media chamber fluidly connected to the water outlet and the water inlet; a four way valve comprising a first valve connection, a second valve connection, a third valve connection, and a fourth valve connection, wherein the first valve connection is connected to the water outlet, the second valve connection is configured to be connected to a hot water pipe, the third valve connection is connected to the cleaning media chamber; and the fourth valve connection is configured to be connected to a drain; a motor connected to the four way valve; and, a controller comprising processing circuitry, wherein the controller is configured to control the motor thereby controlling a path of water through the four way valve. In some embodiments the water inlet is a cold water inlet and a check valve is installed between the cold water inlet and the cleaning media tank. In another embodiment, the water inlet is a return line to the water heater. In some embodiments, the cleaning media chamber is a pod or a cartridge. The cleaning media chamber can comprise a chemical descaling agent or an abrasive cleaning agent. The controller can be further configured to automatically descale the water heater at a predetermined time. In some embodiments, the controller is configured to calculate a time to descale based on hardness of water and automatically start a descaling process once the time to descale has passed. In some embodiments, the water heater additionally comprises a solenoid valve in the water inlet. The controller can be further configured to operate the solenoid valve. In embodiments, the controller is further configured to initiate a cleaning cycle, wherein the cleaning cycle comprises, in order: rotating the four way valve with the motor such that the four way valve forms a fluid path only between the water outlet and the cleaning media chamber, thereby allowing flow of water through the cleaning media chamber and into the water inlet; rotating the four way valve with the motor such that the four way valve forms a fluid path only between the water outlet and the drain; and rotating the four way valve with the motor such that the four way valve forms a fluid path only between the water outlet and the hot water pipe. In specific embodiments, the four way valve is disposed within the water heater.

Another general embodiment of the disclosure is an automatic descaling assembly comprising: a hot water inlet fitting connected to a hot water inlet line; a hot water outlet fitting connected to a hot water outlet line; a drain line fitting connected to a drain line; a water heater inlet fitting connected to a cleaning media outlet line; a four way valve comprising one valve inlet and three valve outlets, wherein the valve inlet is only fluidly connected to one valve outlet of the three valve outlets at a time and wherein the valve inlet is connected to the hot water inlet line and the valve outlets are connected to the hot water outlet line, the drain line, and the cleaning media outlet line; a motor connected to the four way valve; a cleaning media chamber fluidly connected to the cleaning media outlet line; and a controller comprising processing circuitry, wherein the controller is configured to control the motor thereby controlling a path of water through the four way valve. The cleaning media chamber can comprise a chemical descaling agent or an abrasive cleaning agent. In embodiments, the controller is configured to calculate a time to descale based on hardness of water. In specific embodiments, the controller is further configured to initiate a cleaning cycle, wherein the cleaning cycle comprises, in order: rotating the four way valve with the motor such that the four way valve forms a fluid path only between the hot water inlet line and the cleaning media outlet line, thereby allowing flow of water through the cleaning media chamber and out of the water heater inlet fitting; rotating the four way valve with the motor such that the four way valve forms a fluid path only between the hot water inlet line and the drain line; and rotating the four way valve with the motor such that the four way valve forms a fluid path only between the hot water inlet line and the hot water outlet line. The automatic descaling assembly can be configured to attach to a tankless water heater.

A third embodiment of the disclosure is a valve assembly comprising: a) a diverter comprising a drive; and a cylinder comprising an inner through hole extending fully through a diameter of the cylinder, a notch connected to an end of the inner through hole and extending 110-150 degrees around a circumference of the cylinder, an inner cleaning hole extending from the bottom of the cylinder and fluidly connected to the inner through hole; and an inner drain hole set apart from the inner cleaning hole and extending from the bottom of the cylinder and fluidly connected to the inner through hole; b) a housing comprising an inner chamber configured to house at least a portion of the cylinder and allowing rotation of the cylinder about an axis of the cylinder; an outer inlet hole and an outer outlet hole located on opposite sides of the housing such that the outer inlet hole and the outer outlet hole are fluidly connected through the inner through hole when the inner through hole is aligned with the outer inlet hole and the outer outlet hole; an outer cleaning hole extending through the bottom of the housing such that the outer cleaning hole can be aligned with the inner cleaning hole when the inner through hole is not aligned with the outer outlet hole, and when thus aligned, the outer cleaning hole is fluidly connected with the outer inlet hole through the inner through hole and the notch; and an outer drain hole extending through the bottom of the housing such that the outer drain hole can be aligned with the inner drain hole when the inner through hole is not aligned with the outer outlet hole and when the outer cleaning hole is not aligned with the inner cleaning hole, and when thus aligned, the outer drain hole is fluidly connected with the outer inlet hole through the inner through hole and the notch; and c) a motor, wherein the motor is configured to rotate the drive and thereby the cylinder of the diverter. In some embodiments the motor is a step motor. The valve can further comprise o-rings.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIG. 3a shows normal operation of a tankless water heater. FIG. 3b shows the water heater during a descaling process. FIG. 3c shows the water heater during a purge of the water heater.

DETAILED DESCRIPTION

Figure 1:
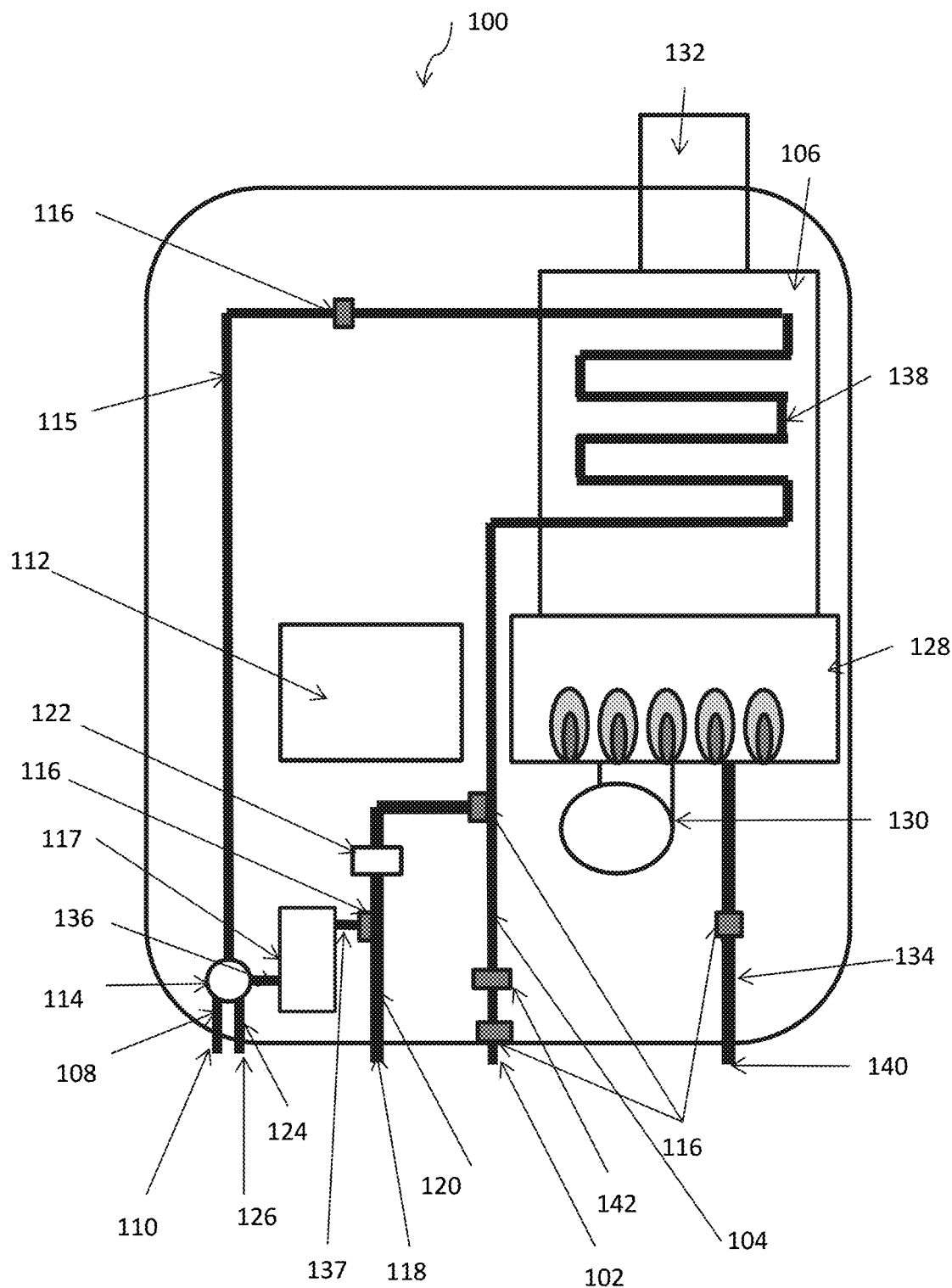
FIG. 1 illustrates an example tankless water heater with an integrated descaling system.

In general, example embodiments provide systems, methods, devices and valves for automatic descaling systems for water heaters. The descaling systems can be standalone systems that are attached to a water heater in use or the descaling systems can be integrated into a water heater. Further, example embodiments can be located in any type of environment (e.g., warehouse, attic, garage, storage, mechanical room, basement) for any type (e.g., commercial, residential, industrial) of user. Water heaters used with example embodiments can be used for one or more of any number of processes (e.g., automatic clothes washers, automatic dishwashers, showers, sink faucets, heating systems, humidifiers). Example types of water heaters that the automatic descaling system could be installed in or with are heating appliances, pool heating equipment, space heating boilers, or other hard to reach heat exchanger systems otherwise compromised by fouling effects.

Automatic descaling systems for water heaters (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of automatic descaling systems for water heaters (or portions thereof) described herein can be made from a single piece (as from a mold, injection mold, die cast, or extrusion process). In addition, or in the alternative, automatic descaling systems for water heaters (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of automatic descaling systems for water heaters, one or more of the components shown may be omitted, repeated, and/or substituted. Accordingly, example embodiments of automatic descaling systems for water heaters should not be considered limited to the specific arrangements of components shown in any of the figures. For example, features shown in one or more figures or described with respect to one embodiment can be applied to another embodiment associated with a different figure or description. Further, the automatic descaling systems for water heaters may be a system separate from a water heater. For example, the automatic descaling system may be sold as a standalone system and then installed in an already functioning water heater system. The automatic descaling system may also be integrated into a tankless water heater.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein can meet (and/or allow a corresponding water heater system or portion thereof to meet) such standards when required.

Example embodiments of automatic descaling systems for water heaters will be described more fully hereinafter with reference to the accompanying drawings, in which example embodiments of a descaling system for a water heater are shown. Water heaters with automatic descaling systems may, however, be embodied in many different forms and should not be construed as limited to the example embodiments set forth herein. Rather, these example embodiments are provided so that this disclosure will be thorough and complete, and will fully convey the scope of water heaters with hard water determination to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of automatic descaling systems for water heaters. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

"Connection," as used herein, refers to directly connected or connected through another component. "Fluidly connected," as used herein, refers to components that are directly connected or connected through another component and can also move a fluid between them without leaking. For example, a valve and a pump can be fluidly connected through a pipe. If a valve is located between two fluidly connected components, the components are still considered fluidly connected as long a fluid path is possible. "Fitting," as used herein, refers to a component that fastens to one or more pipes or tubing sections. "Lines" as use herein refers to a water tight tube such as a pipe.

FIG. 1 illustrates an example tankless water heater 100 with an integrated automatic descaling system. The tankless water heater 100 includes a water inlet fitting 102 connected to a water inlet line 104 which typically receives unheated water from a municipal water source or a well. Water flows into the water inlet line 104 and then into the heat exchanger 106 which uses a power source, such as electricity or gas (shown), to generate heat which is then exchanged with the water, thereby heating the water. The heat in the heat exchanger 106 can be generated through electricity or gas. The heated water flows into the four way valve assembly 114 from a hot water line 115. The heated water can then flow out of the tankless water heater 100 through a water outlet line 108 and an outlet fitting 110 which can be connected to hot water pipes. The operation of the tankless water heater 100 and the descaling system is controlled by a controller 112. The integrated descaling system comprises the four way valve assembly 114 and a media compartment 117. The media compartment 117 is connected to a cleaning media inlet line 136 and a cleaning media outlet line 137. The tankless water heater 100 may also comprise valves 116 that are used in the normal operation of a tankless water heater. The tankless water heater 100 also comprises a return fitting 118, a return line 120, and a return pump 122, configured to cycle hot water through the plumbing system in order to keep hot water accessible for instant demand. The four way valve assembly 114 is also connected to a drain line 124 and a drain fitting 126 which is configured to be connected to a drain pipe.

Also included in the tankless water heater 100 are an ignitor 128 (also sometimes called a burner 128), an air moving device 130, and a vent 132. The ignitor 128 of the tankless water heater 100 can be a flame or other source of heat that is ignited or otherwise initiated (i.e. electrical) when a demand for heated water is detected. Fuel (e.g., natural gas, propane) can be delivered to the ignitor 128 through a valve 116 using a gas inlet line 134. The gas inlet line is connected to a gas fitting 140. A hard water sensor 142 may also be included.

The tankless water heater 100 can include multiple signal and/or power transfer links (not shown). The signal and/or power transfer links can also be used to transfer signals and/or power between the tankless water heater 100 components. For example, between the controller 112 and four way valve assembly 114; between the controller 112 and any one of the valves 116; between the controller 112 and the air moving device 130; and between the controller 112 and the igniter 128. Signal transfer links can be wired or wireless.

A signal can be sent from the controller 112 to the four way valve assembly 114 in order to control the direction of water output from the four way valve 114. The input to the four way valve assembly 114 is from the hot water line 115. However, depending on the rotation of the four way valve assembly 114, the output of the four way valve assembly 114 is to the hot water outlet line 108, the drain line 124, or the cleaning media inlet line 136.

The air moving device 130 can be used to direct the heat generated by the ignitor 128 toward the heat exchanger 106. The air moving device 130 can be a fan, a blower, and/or any other device that can force the heat generated by the ignitor 128 toward the heat exchanger 106. The air moving device 130 can be controlled automatically or by the controller 112.

A heat exchanger coil 138 is filled with water that is circulated therethrough. One end of the coil 138 is coupled to the water inlet line 104, thereby receiving unheated water. As the water circulates through the coil 138 it continues to absorb the heat absorbed from the ignitor 128 by the coil 138. The water in the coil 138 can be circulated using a pump, gravity, pressure differentials, and/or any other method for circulating water. When the water reaches the other end of the coil 138 of the heat exchanger 106, the water has absorbed enough heat to become heated water. The other end of the coil 138 of the heat exchanger 106 is coupled to the hot water line 115, the four way valve assembly 114, which is also connected to the hot water outlet line 108, and can deliver the heated water to a pipe connected to the outlet fitting 110.

Those of ordinary skill in the art will appreciate that a tankless water heater can have any of a number of other configurations. In any case, the controller 112 can be aware of the devices, components, ratings, positioning, and any other relevant information regarding the tankless water heater 100. In some cases, one or more devices of the tankless water heater 100 can have its own local controller, for example, the four way valve assembly 114. In such a case, the controller 112 can communicate with the local controller using additional signal transfer links. The tankless water heater 100 can also include a number of other components generally considered part of the appliance system which are not shown for conciseness.

Figure 2:
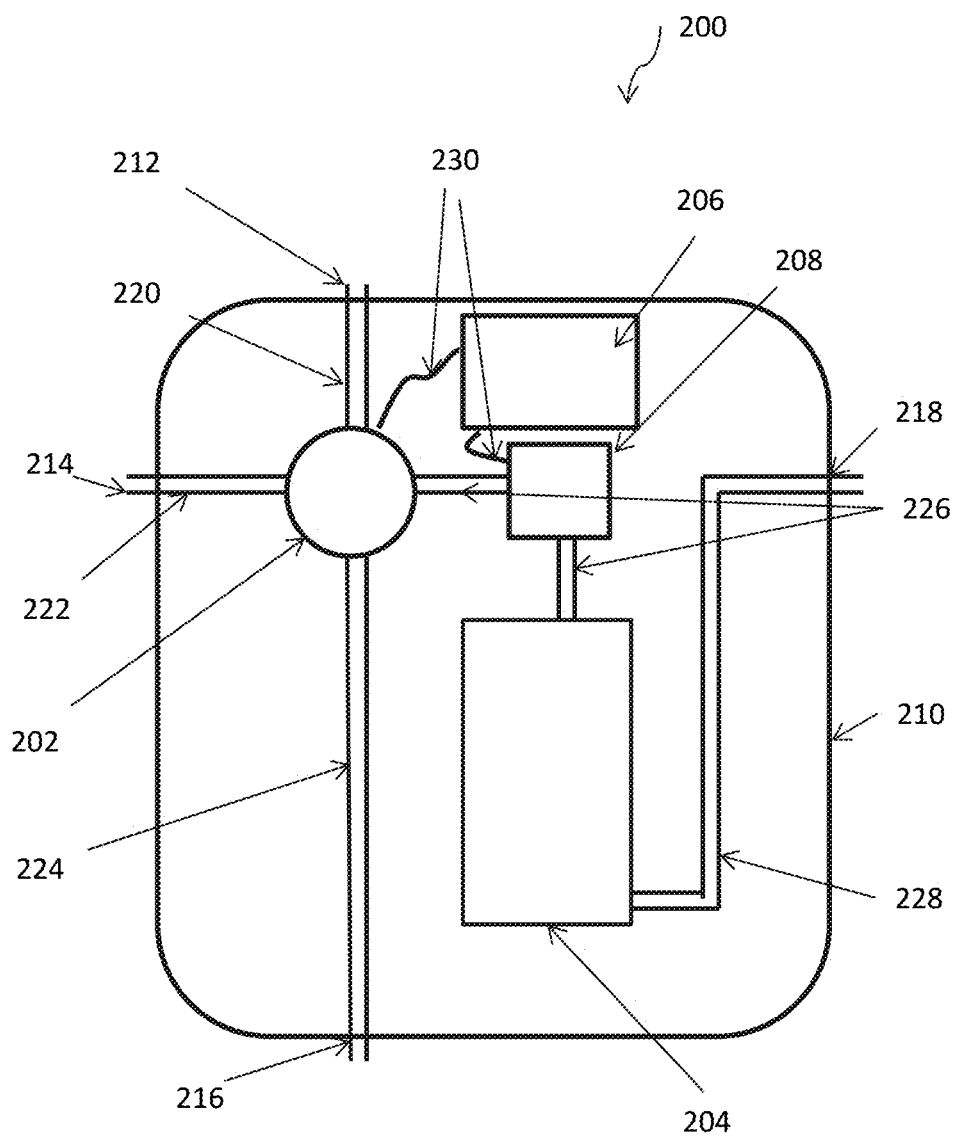
FIG. 2 illustrates an example standalone descaling system for a tankless water heater.

FIG. 2 is an example of a standalone descaling system 200 for water heaters. The standalone descaling system 200 comprises a four way valve assembly 202, a cleaning media compartment 204, and a controller 206. A pump 208 may optionally be included. The standalone descaling system is housed in a descaling assembly housing 210 which includes four fittings for pipes to be attached: a hot water inlet fitting 212 configured to be connected to a hot water outlet from a water heater; a hot water outlet fitting 214 configured to be attached to hot water pipes; a drain fitting 216 configured to be connected to a drain; and a water heater inlet fitting 218 configured to be connected to the return line or water inlet into a hot water heater. The line from the water heater inlet fitting 218 can be connected to the return line or water inlet through the use of a check valve, for example. If a pump is already installed with a return line, the pump 208 may not be needed in the system. The hot water inlet fitting 212 is connected to the hot water inlet line 220 which is also connected to the inlet of the four way valve assembly 202; the hot water outlet fitting 214 is connected to the hot water outlet line 222 which is also connected to an outlet of the four way valve assembly 202; and, the drain fitting 216 is connected to the drain line 224 which is also connected to an outlet of the four way valve assembly 202. An outlet of the four way valve assembly 202 is also connected to a cleaning media inlet line 226 which is then connected to the pump 208 and the cleaning media compartment 204. The cleaning media compartment 204 is connected to a cleaning media outlet line 228 and then to the water heater inlet fitting 218. In this way, water pumped through the hot water inlet line 220, through the four way valve assembly 202 into the cleaning media inlet line 226, and into the cleaning media compartment 204 where cleaning media gets mixed into the water. Water mixed with the cleaning media is then pumped through the cleaning media outlet line 228, and will then be pumped back into the water heater through a return line or a water inlet line. The inlet of the four way valve assembly 202 can only be fluidly connected to one of the three outlets of the four way valve assembly 202 at a time. The controller 206 is connected to a motor (not shown) on the four way valve assembly 202 through a signal transfer link 230. The pump 208 can also be connected to the controller 206 through a signal transfer link 230. Directions of flow are shown by arrows 326.

Figure 3A:
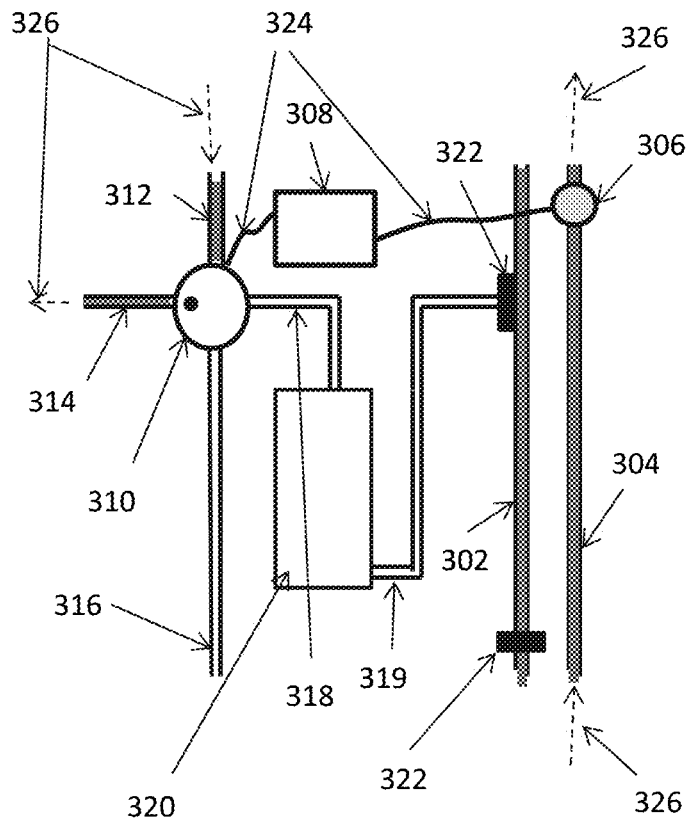
FIGS. 3a-c illustrate the operation of the descaling system at different times in the cleaning cycle.
Figure 3B:
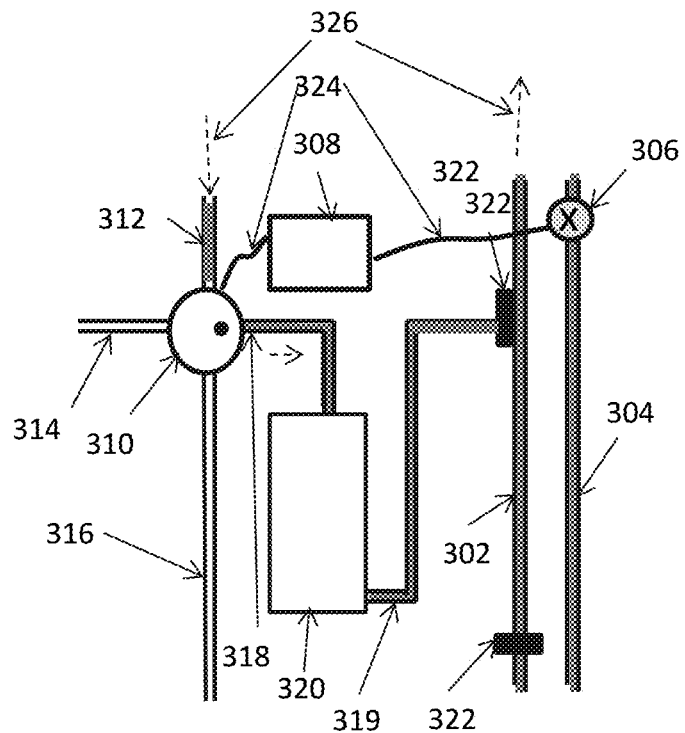
Figure 3C:
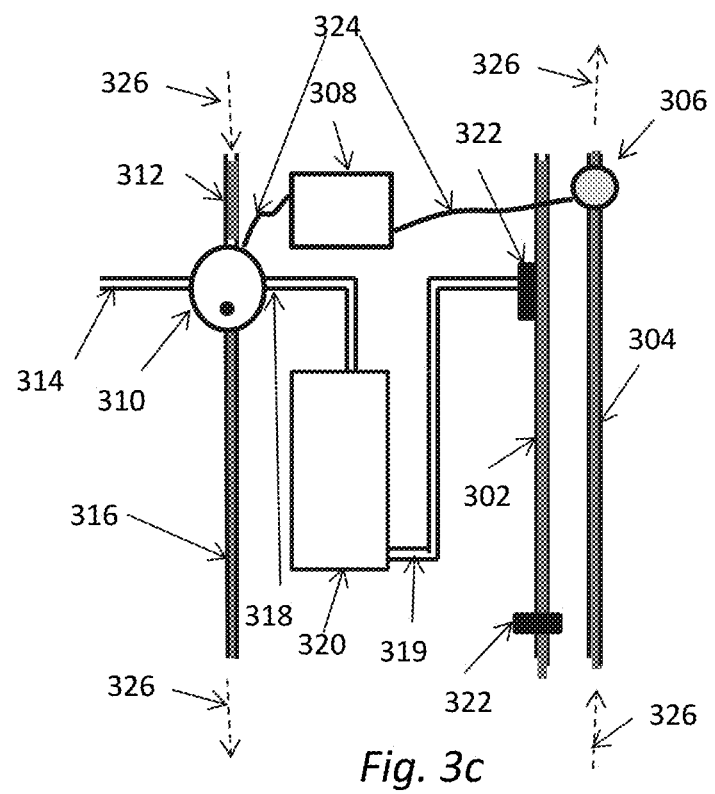

FIGS. 3a-c illustrate the operation of an example automatic descaling system integrated within a water heater which has a return line 302, a return line pump (not shown), a water inlet line 304, a solenoid valve 306, and a controller 308 installed. The automatic descaling system includes a four way valve assembly 310, an inlet line 312, a hot water outlet line 314, a drain line 316, a cleaning media inlet line 318, a cleaning media outlet line 319, and a cleaning media compartment 320. A check valve 322 can be installed between the cleaning media outlet line 319 and the return line 302. The solenoid valve 306 is installed in the water inlet line 304 and controls the flow of water into the water heater from the water inlet line. A pump (not shown) is installed in the return line. When the return line pump is activated water flows from the hot water lines in the building back through the water heater, keeping all of the water within the hot water pipes hot. The controller 308 is connected to the four way valve assembly 310 and the solenoid valve 306 through signal transfer links 324. Direction of the flow of water 326 is shown with dotted arrows in FIGS. 3a-3c FIG. 3a illustrates the normal operation of the tankless water heater during active heating of water. The solenoid valve is open and water flows through the water inlet line 304 usually from a municipal source or from a well and into the heat exchanger (see FIG. 1). When the return pump is active, water also flows through the return line 302 and into the heat exchanger. After being heated by the heat exchanger, the water flows into the inlet line 312, through the four way valve assembly 310 and into the hot water outlet line 314. The four way valve assembly 310 is configured to flow water from the inlet line 312 and either into the hot water outlet line 314, the drain line 316, or the cleaning media inlet line 318. The four way valve assembly is configured such that no fluid is exchanged within the four way valve assembly 310 between the hot water outlet line 314, the drain line 316, or the cleaning media inlet line 318.

When the controller 308 determines that a descaling process should be initiated, the controller 308 sends a signal to the motor on the four way valve assembly 310, which rotates the four way valve assembly 310 such that fluid only moves from the water inlet line 312 to the cleaning media inlet line 318. The controller also closes the solenoid valve 306 so that no new water can flow into the system.

FIG. 3b illustrates the first step in the cleaning process when the four way valve assembly 310 moves fluid from the water inlet line 312 to the cleaning media inlet line 318. In this step, the solenoid valve 306 is closed as discussed above, so no water is let into the water heater from the municipal source. Instead, the return line pump is activated and water already within the water heater is circulated by the pump through the return line 302, into the heat exchanger, through the water inlet line 312, through the four way valve assembly 310, into the cleaning media inlet line 318, through the cleaning media compartment 320, into the cleaning media outlet line 319, and back into the return line 302. While the water is being circulated through the lines, the water passes through the cleaning media compartment 310 and cleaning media is dissolved or suspended in the water. The cleaning media is then circulated with the water through the tankless water heater, thereby descaling the lines within the tankless water heater. Additionally, the pump can be paused during the descaling cycle in order to let the cleaning media soak within the water heater.

When the controller 308 determines that enough time has passed, or enough cycles of circulation through the cleaning media chamber has passed, the controller 308 sends a signal to the motor on the four way valve assembly 310, which rotates the four way valve assembly 310 such that the fluid only moves from the water inlet line 312 to the drain line 316 as shown in FIG. 3c. The controller 308 also opens the solenoid valve 306, allowing new water into the water heater. Water then enters the tankless water heater through the water inlet line, washing through the coils, and back through the water inlet line 312 and out the drain line 316, thus, flushing the cleaning solution out of the tankless water heater, without letting any of the cleaning solution back into the hot water supply to be used by a user.

The configurations shown in FIGS. 3b and 3c can be cycled back and forth as determined by the controller 308. After the last purging of the cleaning material (FIG. 3c), the tankless water heater can resume normal operation, as shown in FIG. 3a.

Cleaning media is located inside of the cleaning media compartment 320. The media compartment can be intrinsic to the descaling system or the cleaning compartment can be added to the descaling system. For example, the media compartment can be a cartridge or a pod that slots into the descaling system or water heater. In some embodiments, the media compartment is a disposable media container. In another embodiment, the media compartment is a refillable cartridge. The refillable cartridge could be mailed to a distributer and recycled. In some embodiments, the media container is a disposable container, such as a pod, in which a tube can perforate the container to access the media. The media compartment can also be individually identifiable, for example by a cartridge encoding mechanism. In some embodiments, the cartridge encoding mechanism could be RFID, EEPROM, magnetic strip, and/or bar codes, for example.

The cleaning media can be any type of media used to descale an appliance such as a chemical cleaning media or an abrasive cleaning media. Examples of chemical cleaning media are acetic acid, hydrochloric acid, and citric acid.

Figure 4:
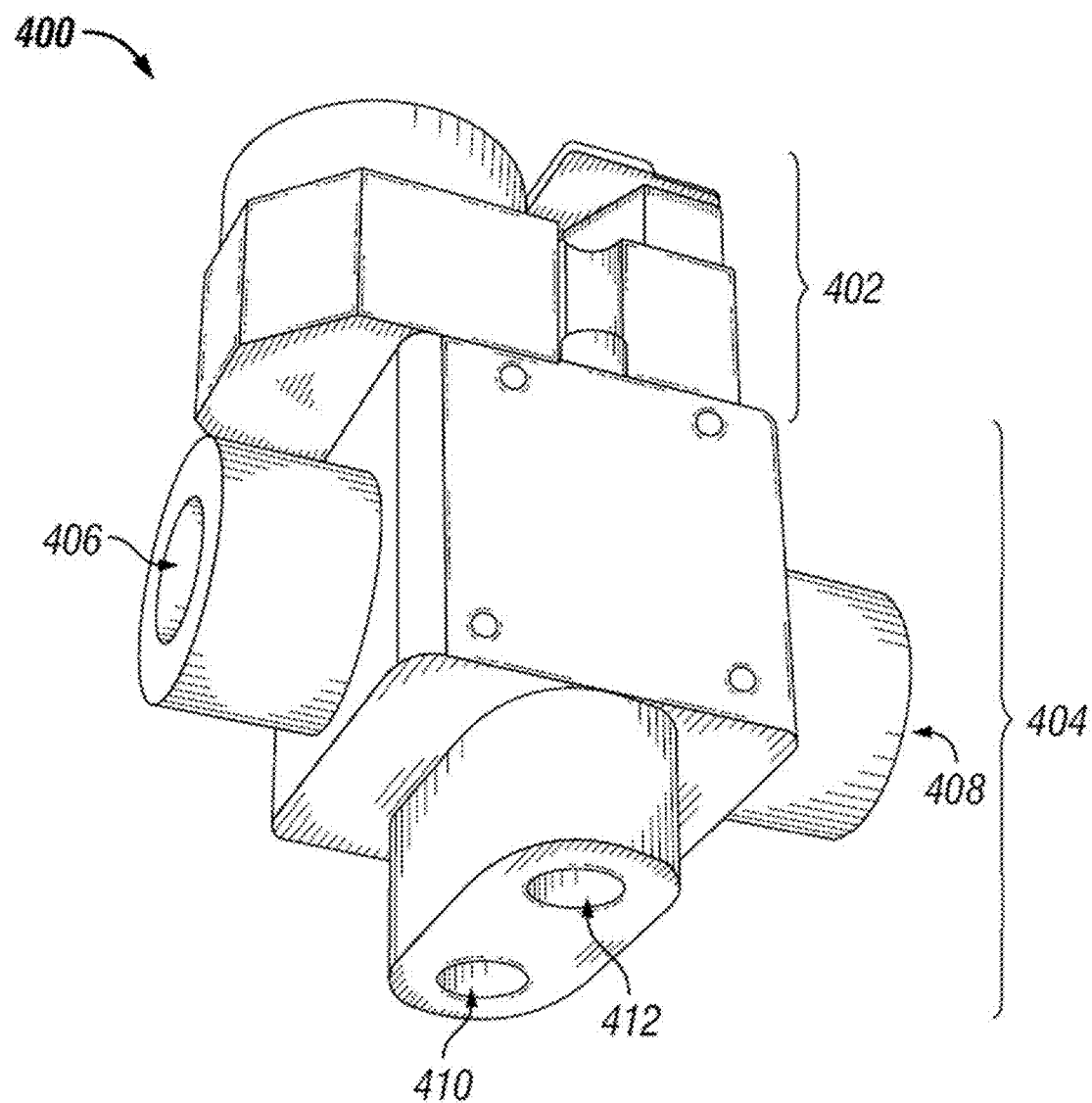
FIG. 4 is an example of a four way valve.
Figure 5:
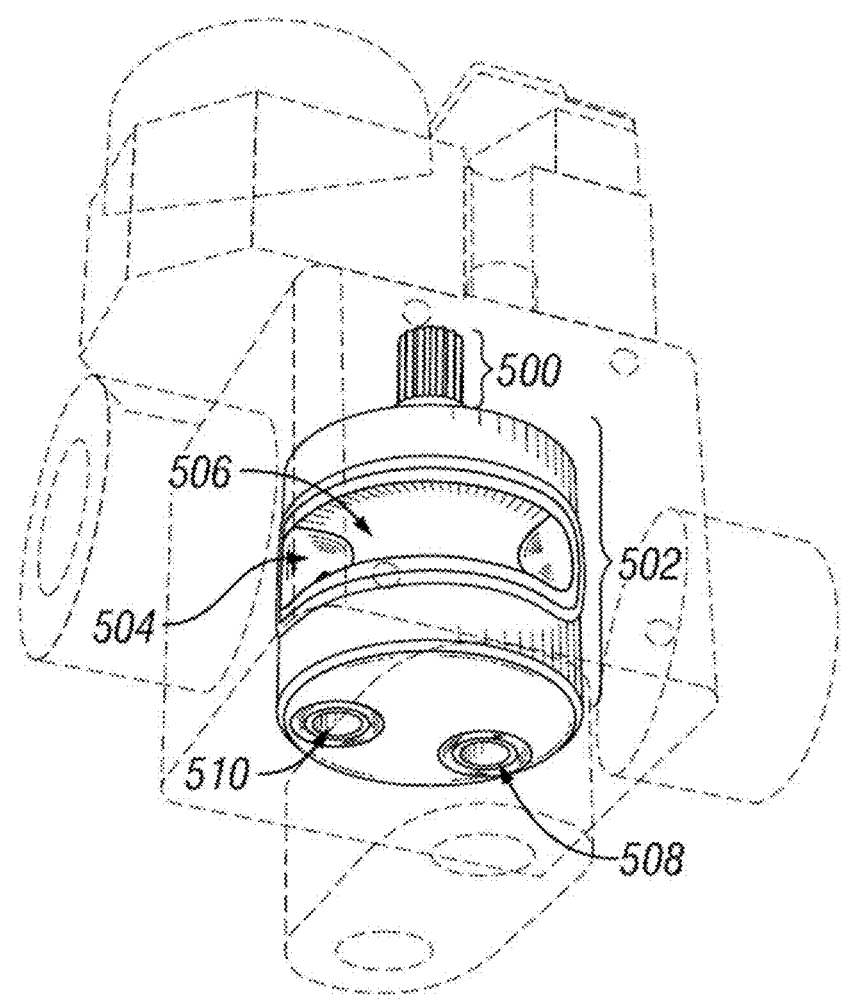
FIG. 5 is the inner cylinder of the four way valve of FIG. 4.
Figure 6:
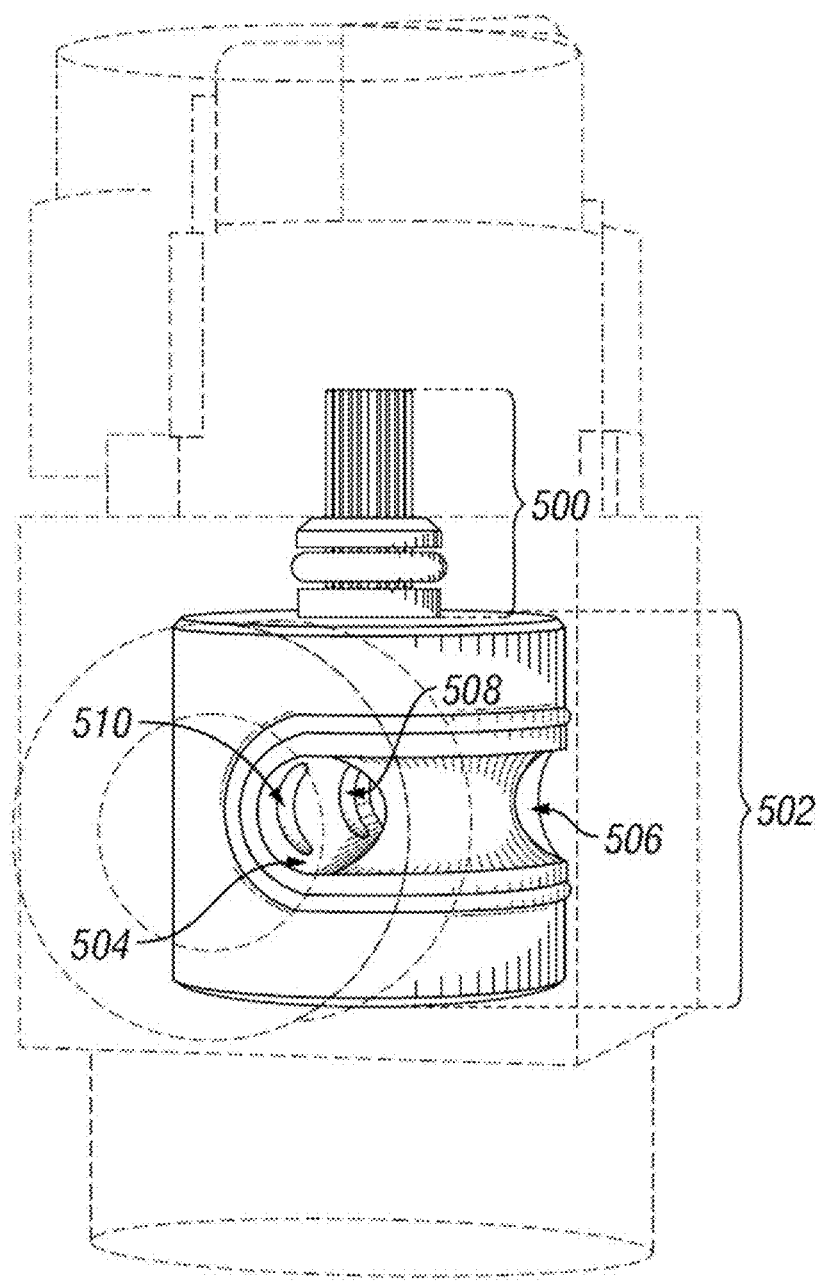
FIG. 6 is another view of the inner cylinder of FIG. 5.

Any four way valve assembly can be used within the disclosure that allows one inlet to be fluidly connected to one of three outlets at a time. FIGS. 4-6 disclose one example of a four way valve assembly that can be used within an automatic descaling system.

FIG. 4 is an exterior view of a four way valve assembly 400. The rotating four way valve assembly comprises a motor 402, a housing 404, and a cylinder internal to the housing 404 (see FIGS. 5 and 6). The housing 404 comprises an outer inlet hole 406, and outer outlet hole 408, an outer cleaning hole 410, and an outer drain hole 412. The housing also comprises an inner cylindrical chamber configured to house the cylinder.

FIG. 5 shows the internal view of the valve 400 comprising drive 500 and cylinder 502. The drive 500 is attached to the cylinder 502. The drive 500 slots into the motor 402, and when the motor 402 turns the drive 500, the cylinder 502 also turns. The cylinder 502 sits within an inner cylindrical chamber of the housing 404. An inner through hole 504 runs through a diameter of the cylinder 502 and can be aligned with the outer inlet hole 406 and the outer outlet hole 408. A notch 506 is connected to one end of the inner through hole 504 and extends about 130 degrees around the circumference of the cylinder 502. As the cylinder 502 is rotated clockwise, out of alignment with the outer inlet hole 406 and the outer outlet hole 408, the outer inlet hole 406 is still fluidly connected to the inner through hole 406 by the notch 506 for about 120 degrees of rotation, while the outer outlet hole 408 is not fluidly connected to the inner through hole 406. An inner drain hole 508 extends from the bottom of the cylinder 502 (opposite the motor 402) and is fluidly connected to the inner through hole 504. An inner cleaning hole 510 is set apart from the inner drain hole 508 and extends from the bottom of the cylinder 502 (opposite the motor 402) and is fluidly connected to the inner through hole 504 (FIG. 6).

When the inner through hole 504 is aligned with the outer inlet hole 406 and the outer outlet hole 408, water can only move through the rotating valve assembly 400 through the outer inlet hole 406, through the inner through hole 504 and out of the outer outlet hole 408 (alignment defined herein as 0°).

When the cylinder is rotated by the motor 60° from 0°, the outer outlet hole 408 is moved out of alignment with the inner through hole 408 and is cut off from the flow of water. However, the outer inlet hole 406 is still fluidly connected with the inner through hole 504 through the notch 506. At 60° rotation, the inner cleaning hole 510 aligns with the outer cleaning hole 410, while the inner drain hole 508 is not aligned with the the outer drain hole 412. Thus, at 60° water can only move through the rotating valve assembly 400 through the outer inlet hole 406, through the notch 506, through the inner through hole 504, through the inner cleaning hole 510, and out the outer cleaning hole 410.

When the cylinder is rotated by the motor 120° from 0°, the outer outlet hole 408 is out of alignment with the inner through hole 408 and is cut off from the flow of water. However, the outer inlet hole 406 is still fluidly connected with the inner through hole through the notch 506. At 120° rotation, the inner drain hole 508 aligns with the outer drain hole 412, while the inner cleaning hole 510 is not aligned with the outer cleaning hole 410. Thus, at 120°, water can only move through the rotating valve assembly 400 through the outer inlet hole 406, through the notch 506, through the inner through hole 504, through the inner drain hole 508, and out the outer drain hole 412.

The motor 402 can be any type of motor that is able to rotate the inner cylinder into the proper position to connect the inlet to the proper outlet. In some embodiments the motor is a step motor or a servomotors. The servomotor could include an encoder or AC/DC motor with limit switches. O-rings are located throughout the rotating four way valve assembly 400, as needed to isolate fluid pathways and prevent leakage.

Figure 7:
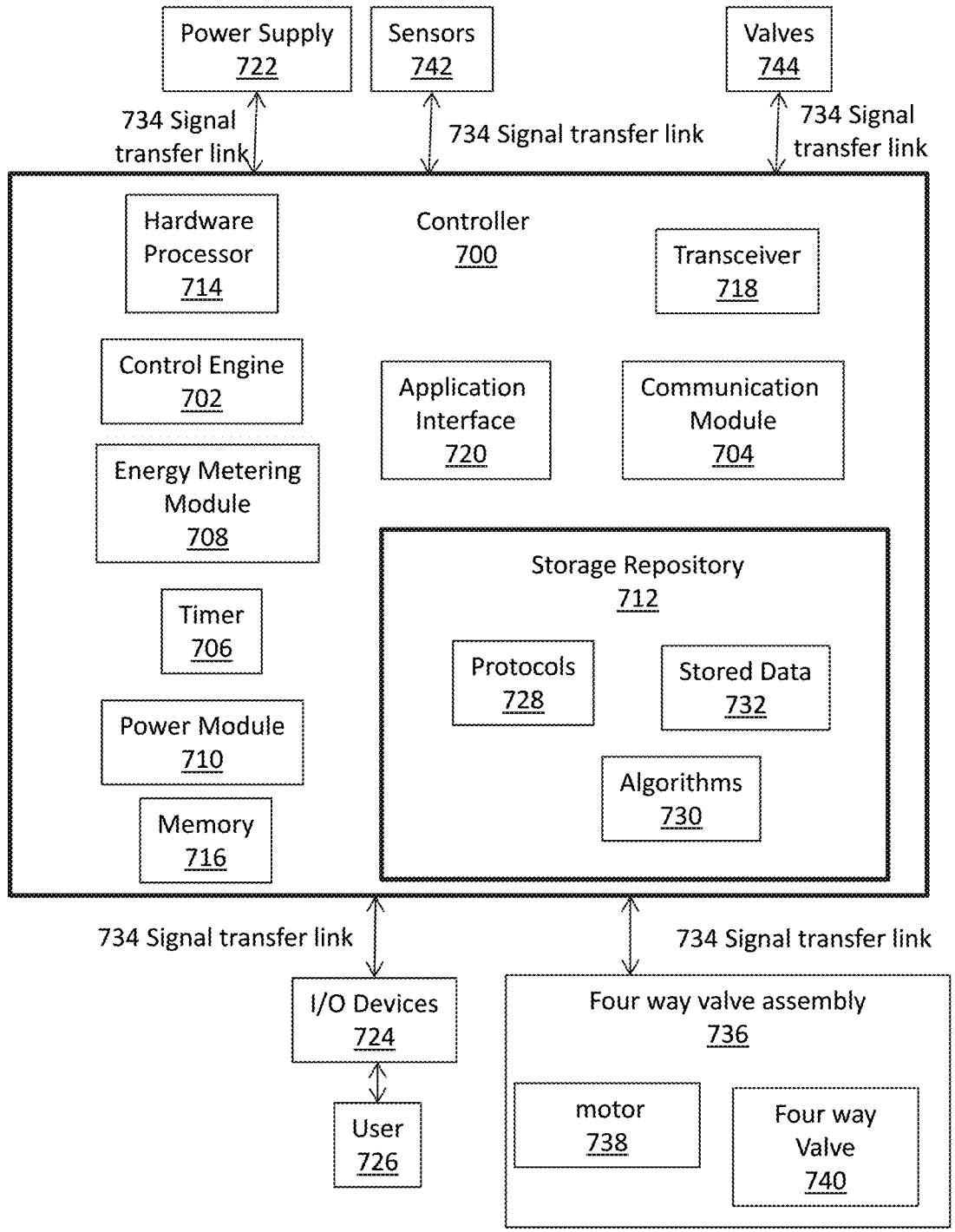
FIG. 7 is a block diagram illustrating an example controller for a descaling system.

If the descaling system is integrated into a water heater, the water heater controller can function to also control the descaling system. If the descaling system is a standalone descaling system, the standalone system may also include a controller. In embodiments, the standalone descaling system comprises a controller that is configured to interface with the controller of a water heater. FIG. 7 below illustrates an embodiment of a controller that is integrated into a water heater. Many of the parts and functions illustrated within the controller 700 of FIG. 7 can also be used within the controller of a standalone system. It should be understood that a standalone system controller would not necessarily need all of the components described in FIG. 7 below that function to control the operation of the water heater during normal operation. As such, there are components of the controller 700 shown in FIG. 7 that may be left out of a controller on a standalone descaling system.

FIG. 7 is an example embodiment of a controller 700 that is integrated into a tankless water heater and can include one or more of a number of components. Such components, can include, but are not limited to, a control engine 702, a communication module 704, a timer 706, an energy metering module 708, a power module 710, a storage repository 712, a hardware processor 714, a memory 716, a transceiver 718, and an application interface 720. FIG. 7 also illustrates example connections of the controller 700 to one or more input/output (I/O) devices 724, user 726, sensors 742, valves 744, and a power supply 722. A bus (not shown) can allow the various components and devices to communicate with one another. A bus can be one or more of any of several types of bus structures, including a memory bus or memory controller, a peripheral bus, an accelerated graphics port, and a processor or local bus using any of a variety of bus architectures. A bus can include wired and/or wireless buses. The components shown in FIG. 7 are not exhaustive, and in some embodiments, one or more of the components shown in FIG. 7 may not be included in an example system. Further, one or more components shown in FIG. 7 can be rearranged. Any component of the example controller can be incorporated into a tankless water heater and can be discrete or combined with one or more other components of a tankless water heater.

A user 726 may be any person or entity that interacts with an automatic descaling system, a tankless water heater and/or the controller 700. Examples of a user 726 may include, but are not limited to, an engineer, an appliance or process that uses heated water, an electrician, an instrumentation and controls technician, a mechanic, an operator, a consultant, a contractor, a homeowner, a landlord, a building management company, and a manufacturer's representative. There can be one or multiple users 726.

The user 726 can use a user system (not shown), which may include a display (e.g., a GUI). The user 726 can interact with (e.g., sends data to, receives data from) the controller 700 via the application interface 720 (described below). The user 726 can also interact with a tankless water heater (including any components thereof, such as one or more of the sensor devices) and/or the power supply 722. Interaction between the user 726, the controller 700, the tankless water heater, the four way valve assembly 736, and the power supply 722 can be conducted using signal transfer links 734.

Each signal transfer link 734 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, cellular networking, Bluetooth, WirelessHART, ISA100) technology. For example, a signal transfer link 734 can be (or include) one or more electrical conductors that are coupled to the controller 700 and to the four way valve assembly 736. A signal transfer link 734 can transmit signals (e.g., communication signals, control signals, data) between the controller 700, the user 726, the tankless water heater (including components thereof), and/or the power supply 722.

The power supply 722 provides power to one or more components (e.g., the the four way valve assembly 736, the controller 700, the heat exchanger) of a tankless water heater. The power supply 722 can include one or more of a number of single or multiple discrete components (e.g., transistor, diode, resistor), and/or a microprocessor. The power supply 722 may include a printed circuit board, upon which the microprocessor and/or one or more discrete components are positioned.

The power supply 722 can include one or more components (e.g., a transformer, a diode bridge, an inverter, a converter) that receives power (for example, through an electrical cable) from an independent power source external to the heating system 100 and generates power of a type (e.g., AC, DC) and level (e.g., 12V, 24V, 120V) that can be used by one or more components of the tankless water heater and/or automatic descaling system. In addition, or in the alternative, the power supply 722 can be a source of power in itself. For example, the power supply 722 can be a battery, a localized photovoltaic power system, or some other source of independent power.

The user 726, the power supply 722, and/or the four way valve assembly 736, can interact with the controller 700 using the application interface 720 in accordance with one or more example embodiments. Specifically, the application interface 720 of the controller 700 receives data (e.g., information, communications, instructions, updates to firmware) from and sends data (e.g., information, communications, instructions) to the user 726, the power supply 722, and/or other components of a tankless water heater. The user 726, the power supply 722, and other components of a tankless water heater can include an interface to receive data from and send data to the controller 700 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 700, the user 726, the power supply 722, and/or other components of a tankless water heater can use their own system or share a system in certain example embodiments. Such a system can be, or contain a form of, an Internet-based or an intranet-based computer system that is capable of communicating with various software. A computer system includes any type of computing device and/or communication device, including but not limited to the controller 700. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Further, as discussed above, such a system can have corresponding software (e.g., user software, sensor device software). The software of one system can be a part of, or operate separately but in conjunction with, the software of another system within a tankless water heater.

The storage repository 712 can be a persistent storage device (or set of devices) that stores software and data used to assist the controller 700 in communicating with the user 726, the power supply 722, and other components of the tankless water heater and/or automatic descaling system. In one or more example embodiments, the storage repository 712 stores one or more protocols 728, algorithms 730, and stored data 732. The protocols 728 can be any procedures (e.g., a series of method steps) and/or other similar operational procedures that the control engine 702 of the controller 700 follows based on certain conditions at a point in time. The protocols 728 can include any of a number of communication protocols 728 that are used to send and/or receive data between the controller 700 and the user 726, the power supply 722, and the water heater 190. A protocol 728 can be used for wired and/or wireless communication. Examples of a protocol 728 can include, but are not limited to, Modbus, profibus, Ethernet, and fiberoptic.

The algorithms 730 can be any formulas, logic steps, mathematical models, and/or other suitable means of manipulating and/or processing data. One or more algorithms 730 can be used for a particular protocol 728. As discussed above, the controller 700 uses information provided by sensors 742 or input to generate, using one or more protocols 728 and/or one or more algorithms 730, information related to the descaling of the tankless water heater.

For example, a protocol 728 and/or an algorithm 730 can dictate when a descaling cycle is to be entered, how many cycles to run, and when to re-enter normal operation. Such protocols 728 and algorithms 730 can be based on information received from sensors 742, from data entered from a user 726, or may be static variables that are programed into the controller 700.

Stored data 732 can be any data associated with a tankless water heater (including any components thereof), any measurements taken by sensors 742, time measured by the timer 706, adjustments to an algorithm 730, threshold values, user preferences, default values, results of previously run or calculated algorithms 730, water system variables such as the harness of water in the system and/or any other suitable data. Such data can be any type of data, including but not limited to historical data for the water heater, calculations, adjustments made to calculations based on actual data, and measurements taken by one or more sensor devices. The stored data 732 can be associated with some measurement of time derived, for example, from the timer 706.

Examples of a storage repository 712 can include, but are not limited to, a database (or a number of databases), a file system, a hard drive, flash memory, some other form of solid state data storage, or any suitable combination thereof. The storage repository 712 can be located on multiple physical machines, each storing all or a portion of the protocols 728, the algorithms 730, and/or the stored data 732 according to some example embodiments. Each storage unit or device can be physically located in the same or in a different geographic location.

The storage repository 712 can be operatively connected to the control engine 702. In one or more example embodiments, the control engine 702 includes functionality to communicate with the user 726, the power supply 722, and other components of the tankless water heater and/or automatic descaling system. More specifically, the control engine 702 sends information to and/or receives information from the storage repository 712 in order to communicate with the user 726, the power supply 722, and other components. As discussed below, the storage repository 712 can also be operatively connected to the communication module 704 in certain example embodiments.

In certain example embodiments, the control engine 702 of the controller 700 controls the operation of one or more components (e.g., the communication module 704, the timer 706, the transceiver 718) of the controller 700. For example, the control engine 702 can activate the communication module 704 when the communication module 704 is needed to send data received from another component (e.g., the four way valve assembly 736).

As another example, the control engine 702 can acquire the current time using the timer 706. The timer 706 can enable the controller 700 to control the components within a tankless water heater. As yet another example, the control engine 702 can direct a sensor 742, such as pH sensor, flow sensor, or temperature sensor, to measure a parameter (e.g., conductivity, temperature, flow rate, pH) and send the measurement by reply to the control engine 702. In some cases, the control engine 702 of the controller 700 can control the position (e.g., open, closed, fully open, fully closed, 50% open) of valves within the tankless water heater. In some embodiment, the controller 700 can control the operation of a descaling operation within the tankless water heater.

Figure 8:
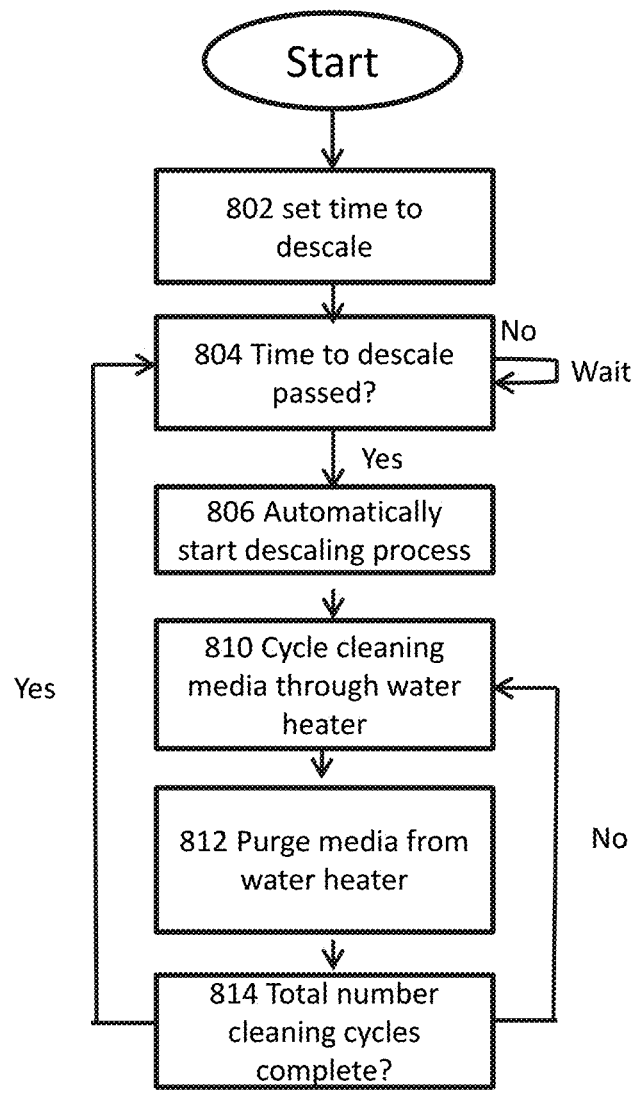
FIG. 8 is an example flow chart for operation of a descaling system.

The control engine 702 can be configured to perform a number of functions that help the control engine 702 make a determination (an estimate) that relates to the time between automatic descaling operations. For example, the control engine 702 can execute any of the protocols 728 and/or algorithms 730 stored in the storage repository 712 and use the results of those protocols 728 and/or algorithms 730 to communicate to a user 726. FIG. 8 below provides more specific examples of how the control engine 702 functions according to certain example embodiments. The control engine 702 can generate an alert or some other form of communication when an automatic descaling operation is initiated and/or ended. In some embodiments, when the controller 700 determines that a descaling operation should be initiated, the controller 700 additionally determines if the descaling operation should be initialed instantly, or if the controller should wait an additional amount of time. For example, the controller 700 could wait to run the descaling operation at a more convenient time, such as during the night or at times determined to have low usage of the water heater.

Using one or more algorithms 730, the control engine 702 can predict the expected time before the tankless water heater 100 needs to be descaled based on sensor data, stored data 732, a protocol 728, one or more threshold values, and/or some other factor. The control engine 702 can keep track of the time between descaling operations and initiate an automatic descaling operation when such a time is reached. The controller 700 can also monitor sensor data during the descaling operation to determine when all of the cleaning media has been used and to restore normal operation at such a time. For example, if a chemical media is used for descaling a pH sensor can be used to determine when all of the chemical media has been purged from the system and only clean water is being cycled through the system. Using one or more algorithms 730, the control engine 702 can also predict the number of cleaning cycles (active cleaning, FIG. 3b and purging, FIG. 3c) needed based on the hardness of water in the system. One embodiment of determining if extra cleaning cycles are needed would utilize a TDS/hardness sensor and look at the TDS or conductivity of the cleaning agent—as scale is removed the TDS or conductivity would increase. The algorithm then runs cleaning cycles until a threshold TDS ceases to be reached. Another example method would be to employ empirical data based on supply water hardness and time between cleanings.

The control engine 702 can perform its evaluation functions and resulting actions on a continuous basis, periodically, during certain time intervals, or randomly. Further, the control engine 702 can perform this evaluation for the present time or for a period of time in the future. For example, during the first startup of a tankless water heater, the control engine 702 can use sensor 742 data to determine an adjusted conductivity, such as the total dissolved solids in a volume of water, based on sensor data and output the determination to a user. The control engine 702 can also prompt a user 726 to enter the hardness of water in the system to be used to predict the time to descaling.

In certain embodiments, the control engine 702 of the controller 700 can communicate with one or more components (e.g., a network manager) of a system external to the tankless water heater 100. For example, the control engine 702 can interact with an inventory management system by ordering a component (e.g., cleaning media) to use to descale the tankless water heater that the control engine 702 has determined needs to be descaled.

The power module 710 of the controller 700 provides power to one or more other components (e.g., timer 706, control engine 702) of the controller 700. In addition, in certain example embodiments, the power module 710 can provide power to one or more components (e.g., the heat exchanger 104) of the tankless water heater 100.

The energy metering module 708 of the controller 700 measures one or more components of power (e.g., current, voltage, resistance, VARs, watts) at one or more points (e.g., output of the power supply 722) associated with a water heater. The energy metering module 708 can include any of a number of measuring devices and related devices, including but not limited to a voltmeter, an ammeter, a power meter, an ohmmeter, a current transformer, a potential transformer, and electrical wiring.

The power module 710 can include one or more components (e.g., a transformer, a diode bridge, an inverter, a converter) that receives power (for example, through an electrical cable) from the power supply 722 and generates power of a type (e.g., AC, DC) and level (e.g., 12V, 24V, 120V) that can be used by the other components of the controller 700 and/or by the water heater.

In addition, or in the alternative, the power module 710 can be a source of power in itself to provide signals to the other components of the controller 700. For example, the power module 710 can be a battery. As another example, the power module 710 can be a localized photovoltaic power system. In certain example embodiments, the power module 710 of the controller 700 can also provide power and/or control signals, directly or indirectly, to the four way assembly 736, sensors 742, and valves 744, for example. In such a case, the control engine 702 can direct the power generated by the power module 710 to one or more of the devices. In this way, power can be conserved by sending power to the devices when those devices need power, as determined by the control engine 702.

The hardware processor 714 of the controller 700 executes software, algorithms 730, and firmware in accordance with one or more example embodiments. Specifically, the hardware processor 714 can execute software on the control engine 702 or any other portion of the controller 700, as well as software used by the user 726, the power supply 722, and the water heater (or portions thereof). The hardware processor 714 can be an integrated circuit, a central processing unit, a multi-core processing chip, SoC, a multi-chip module including multiple multi-core processing chips, or other hardware processor in one or more example embodiments. The hardware processor 714 is known by other names, including but not limited to a computer processor, a microprocessor, and a multi-core processor.

In one or more example embodiments, the hardware processor 714 executes software instructions stored in memory 716. The memory 716 includes one or more cache memories, main memory, and/or any other suitable type of memory. The memory 716 can include volatile and/or nonvolatile memory. The memory 716 is discretely located within the controller 700 relative to the hardware processor 714 according to some example embodiments. In certain configurations, the memory 716 can be integrated with the hardware processor 714.

In certain example embodiments, the controller 700 does not include a hardware processor 714. In such a case, the controller 700 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 700 (or portions thereof) to be programmable and function according to certain logic rules and thresholds without the use of a hardware processor. Alternatively, FPGAs, IGBTs, ICs, and/or similar devices can be used in conjunction with one or more hardware processors 714.

The transceiver 718 of the controller 700 can send and/or receive control and/or communication signals. Specifically, the transceiver 718 can be used to transfer data between the controller 700 and the user 726, the power supply 722, and a tankless water heater (or portions thereof). The transceiver 718 can use wired and/or wireless technology.

Memory 716 represents one or more computer storage media. Memory 716 includes volatile media (such as random access memory (RAM)) and/or nonvolatile media (such as read only memory (ROM), flash memory, optical disks, magnetic disks, and so forth). Memory 716 includes fixed media (e.g., RAM, ROM, a fixed hard drive, etc.) as well as removable media (e.g., a flash memory drive, a removable hard drive, an optical disk, and so forth).

One or more I/O devices 724 allow a customer, utility, or other user to enter commands and information to a tankless water heater, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a display, a monitor, or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media."

FIG. 8 shows a flowchart for an example embodiment. While the various steps in the flowchart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. In addition, a person of ordinary skill in the art will appreciate that additional steps not shown in FIG. 8 can be included in performing these methods in certain example embodiments.

Accordingly, the specific arrangement of steps should not be construed as limiting the scope. In addition, a particular computing device, as described, for example, in FIG. 7 above, is used to perform one or more of the steps for the methods described below in certain example embodiments. For the methods described below, unless specifically stated otherwise, a description of the controller 700 performing certain functions can be applied to the control engine 702 of the controller 700.

An example method of FIG. 8 begins at the START step. The START could be during the installation and set-up of a water heater, for example. In step 802 a time to descale variable is set which determines the amount of time that should pass before a descaling process is initiated. The time to descale variable can be set to a specific date, or can be an amount of time that needs to pass, for example, a predetermined amount of time. The time to descale (predetermined time) can be a set time period, such as 1 year, 11 months, 10 months, or 9 months, for example. The time to descale can be calculated based on other variables, such as the hardness of water that will pass through the water heater. Once the amount of time to descaling has passed, or the date and time of descaling occurs, a descaling process is initiated (step 806). The four way valve assembly is positioned such that hot water output from the hot water heater is diverted through a cleaning media compartment which mixes cleaning media into the water and cycles the cleaning media back through the water heater (step 810). In step 810 inlet valves connecting the water heater to new water are closed. The cleaning media water can be constantly cycled back through the water heater for a set period of time and/or the water cycling can be paused such that the water heater soaks with the cleaning media water. In step 812 the cleaning media water is purged from the water heater. In this step the four way valve assembly is positioned such that hot water output from the hot water heater is diverted to the drain line, while valves allowing clean water are open such that clean water enters the water heater from the inlet line. Step 812 can occur for a predetermined amount of time or the water heater can monitor a variable, such as pH, to determine when all of the cleaning media water has been purged from the water heater. In step 814, if the controller determines that another cycle should be run, the process returns to step 810. The number cleaning cycles can be a set amount of cycles, such as 0, 1, 2, 3, 4, 5, 6, or 7, or the controller can calculate the number of cycles needed. If another cycle is not entered, the controller returns the water heater to normal operation and starts the clock again.

The automatic descaling system cleans and protects a tankless water heating unit in an automated fashion, thereby reducing the effort on the consumer's part, ensuring optimum performance, and offering whole system protection. By monitoring and routinely cleaning the unit, the automatic descaling system protects the appliance while keeping consumer required maintenance and attention to a minimum, as well as reducing overall maintenance cost. The system can permit routine cleaning to take place without the need for professional services offered by plumbers.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
   a water inlet;
   a water outlet;
   a heating chamber;
   a cleaning media chamber fluidly connected to the water outlet and the water inlet;
   a four way valve comprising a first valve connection, a second valve connection, a third valve connection, and a fourth valve connection, wherein the first valve connection is connected to the water outlet, the second valve connection is configured to be connected to a hot water pipe, the third valve connection is connected to the cleaning media chamber; and
   the fourth valve connection is configured to be connected to a drain;
   a motor connected to the four way valve; and,
   a controller comprising processing circuitry, wherein the controller is configured to:
   determine whether to initiate a descaling process; and
   in response to determining to initiate the descaling process, (i) output a signal to a pump to direct a flow of water to the water inlet, and (ii) output a signal to the motor of the four way valve to direct the flow of water to the cleaning media chamber such that a mixture of at least a portion of the flow of water and at least a portion of cleaning media contained within the cleaning media chamber is directed from the cleaning media chamber to the water inlet.

2. The water heater of claim 1, wherein the water inlet is a cold water inlet and a check valve is installed between the cold water inlet and the cleaning media chamber.

3. The water heater of claim 1, wherein the water inlet is a return line, the return line being configured to direct water from the water heater.

4. The water heater of claim 1, wherein the cleaning media chamber is a pod or a cartridge.

5. The water heater of claim 1, wherein the cleaning media chamber comprises a chemical descaling agent.

6. The water heater of claim 1, wherein the cleaning media chamber comprises an abrasive cleaning agent.

7. The water heater of claim 1, wherein the controller is further configured to automatically initiate the descaling process at a predetermined time.

8. The water heater of claim 1, wherein the controller is configured to calculate a time to descale based on hardness of water and automatically initiate the descaling process once the time to descale has passed.

9. The water heater of claim 1, wherein the water heater additionally comprises a solenoid valve in the water inlet.

10. The water heater of claim 9, wherein the controller is further configured to operate the solenoid valve.

11. The water heater of claim 1, wherein the controller is further configured to:
    initiate the descaling process, wherein the descaling process comprises, in order:
    rotating the four way valve with the motor such that the four way valve forms a fluid path only between the water outlet and the cleaning media chamber, thereby allowing flow of water through the cleaning media chamber and into the water inlet;
    rotating the four way valve with the motor such that the four way valve forms a fluid path only between the water outlet and the drain; and
    rotating the four way valve with the motor such that the four way valve forms a fluid path only between the water outlet and the hot water pipe.

12. The water heater of claim 1, wherein the four way valve is disposed within the water heater.

* * * * *